United States Patent [19]
Marazzi

[11] Patent Number: 5,373,574
[45] Date of Patent: Dec. 13, 1994

[54] CONNECTOR FOR AN OPTICAL FIBER

[75] Inventor: Silvio Marazzi, Cavigliano, Switzerland

[73] Assignee: Diamond SA, Lonsome, Switzerland

[21] Appl. No.: 59,358

[22] Filed: May 11, 1993

[30] Foreign Application Priority Data

May 20, 1992 [CH] Switzerland .......................... 1627/92

[51] Int. Cl.⁵ .............................................. G02B 6/36
[52] U.S. Cl. ....................................... 385/78; 385/72; 385/76
[58] Field of Search ..................... 385/78, 72, 68, 60, 385/55, 58, 66, 76, 84

[56] References Cited

U.S. PATENT DOCUMENTS

| | | | |
|---|---|---|---|
| 4,205,897 | 6/1980 | Stankos | 385/60 |
| 4,208,092 | 6/1980 | Monaghan et al. | 385/76 |
| 4,804,243 | 2/1989 | Borsuk et al. | 385/76 |
| 4,934,785 | 6/1990 | Mathis et al. | 385/68 |
| 4,953,941 | 9/1990 | Takahashi | 385/72 |
| 5,129,023 | 7/1992 | Anderson et al. | 385/72 X |

FOREIGN PATENT DOCUMENTS 8221983 4/1993 Germany .

OTHER PUBLICATIONS

European Search Report.

*Primary Examiner*—Rodney B. Bovernick
*Assistant Examiner*—Phan T. Heartney
*Attorney, Agent, or Firm*—Shoemaker and Mattare, Ltd.

[57] ABSTRACT

For the axial springing of the connector pin (1), the connector pin is held firmly in a receiving socket (3) which is connected via a spring element (6) with the actual connector body (2). The receiving socket, the spring element and at least a part of the connector body are integrally formed. Through suitable choice of material and shape, the spring element (4) obtains the required spring characteristics. By means of this design, the connector has only a few individual components and is easily assembled.

7 Claims, 2 Drawing Sheets

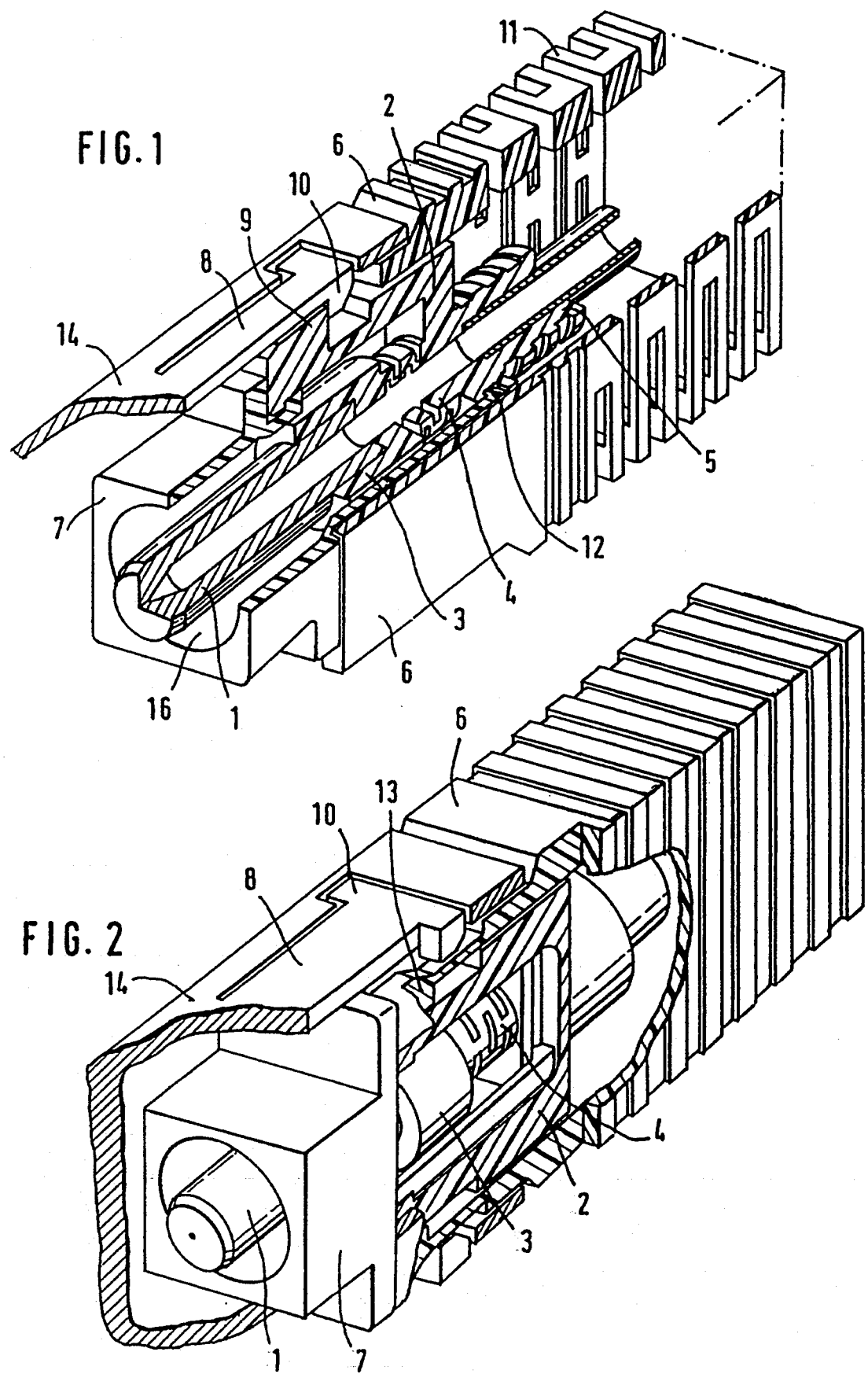

5,373,574

CONNECTOR FOR AN OPTICAL FIBER

BACKGROUND OF THE INVENTION

The invention concerns a connector for an optical fiber according to the preamble of claim 1. In order to ensure permanent transmission quality, with most optical fiber plug connectors an axial spring system for the connector pins is nowadays indispensable. The spring system causes the faces of the opposing connector pins to be pressed against each other, and indeed just when a tensile loading is exerted onto the connector body on one side.

An optical fiber plug-in connector has already been made known through DE-U-82 21 983.4, with which the connector pin is held within the connector body via a spring-elastic intermediate member. The spring element can here be a coiled pressure spring, or, in accordance with one embodiment, it can be also a membrane arranged directly on the connector pin. In many cases, however, the connector pin is a high precision component made from a hard material, such as, for example, hard metal or ceramic, so that integration of spring elements onto the connector pin is not possible. In practice, a separate coiled pressure spring for springing of the connector pin has therefore become standard. A disadvantage of known connectors is their relatively complicated construction, demanding the assembly of numerous components, such as, for example, springs, retaining rings, ring nuts etc.

SUMMARY OF THE INVENTION

It is therefore a purpose of the invention to create a connector of the type mentioned in the introduction, where the problem of axial springing of the connector pin is solved in the simplest way, and indeed independent from the type of material from which the connector pin is made. A further purpose of the invention is to reduce the effort required for assembly of the connector through a reduction in individual components. This purpose is, according to the invention, solved with a connector which possesses the features in claim 1. The integral form of the spring element, of at least one part of the connector body and, as the case may be, of the receiving socket, has the effect that a component with the same spring characteristics is always available, independent from the choice of material for the connector pin. Laborious assembly work, for example for deployment of a coiled pressure spring or similar, become completely superfluous. A unit, comprising receiving socket, spring element and connector body, is manufactured with particular advantage from plastic. By means of injection molding, relatively compact and complicated components can be produced. With that, it is for example also possible to form the spring element as a skeleton type, interrupted, hollow, cylindrical section.

The connector pin can be manufactured from metal, metal-ceramic or ceramic, and it can be glued into the receiving socket. In this way, also materials which are difficult to work can be employed without the spring mechanism demanding another type of construction. Naturally, the connector pin can also be manufactured from a plastic material, in certain applications it being even conceivable that the connector pin is formed integrally with the receiving socket, respectively that an actual receiving socket is completely dispensed with and that the connector pin is formed integrally with the spring element.

BRIEF DESCRIPTION OF THE DRAWINGS

Further advantages and individual features of the invention are evident from the following descriptions and from the drawings. Namely:

FIG. 1 a perspective view of a partly cut-open connector possessing the features of the invention, FIG. 2 alternative detail views of the connector according to FIG. 1, and FIG. 3 a cross section through a connector in a highly simplified representation.

DESCRIPTION OF THE PREFERRED EMBODIMENT

Figure 3:
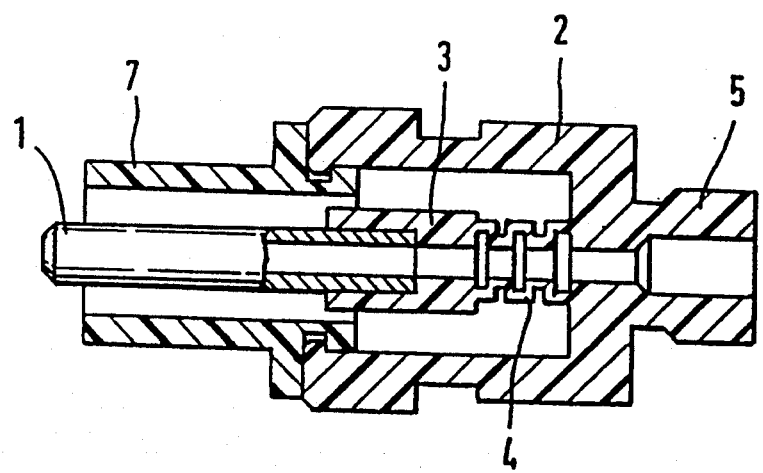

A connector is shown in FIGS. 1 and 2 which possesses a connector body 2 as a central component which is formed integrally with a receiving socket 3 and with a spring element 4. The receiving socket and the spring element have an approximately hollow-cylindrical shape, whilst the connector body possesses an approximately rectangular cross sectional form. Likewise, a hub 5, for nonpositive accommodation of a cable which is not more clearly shown here, is also formed integrally with the connector body.

The connector body 2 has, on two opposing sides, a locking shoulder 9, which serves to lock the connector into a sleeve portion 14. For this purpose, the sleeve portion has a spring action tongue 8, on the end of which a locking catch 10 is arranged. On reaching the required insert depth, the locking catch 10 engages behind the locking shoulder 9.

The actual connector pin 1, for example made from hard metal or ceramic, is glued into the receiving socket 3. An end piece 7, for protection of the connector pin, is snapped onto the connector body 2 with the aid of locking tabs 12. The end piece has a bore 16 which surrounds the major portion of the connector pin 1, an annular gap being formed between the inner wall of the bore and the connector pin.

The connector body 2 is mounted to be axially displaceable within a connector housing 6. The connector housing 6 surrounds the major portion of the connector body and it is provided with a kink protector 11 at its cable end. It can be seen from FIG. 2 that the locking shoulder 9 protrudes out of an opening in the connector housing 6 and that the connector housing possesses an incline 13 on both sides of the locking shoulder 9.

The incline 13 has the effect that, with a tensile force applied to the connector housing 6, said connector housing travels backwards in relation to the still firmly latched connector body 2, whereupon the incline 13 presses the locking catch 10 so far upwards until this releases the locking shoulder 9. Subsequently, the connector can be withdrawn out of the sleeve portion 14. This system of Push-Pull connection is in principle already known.

The spring element 4 is pierced, as a skeleton, so that in the axial direction it possesses the required spring properties. The spring element 4, however, also limits the radial play of the connector pin 1 in a particularly advantageous way. According to the design of the spring element, differing spring properties can be aimed at. The connector according to the FIGS. 1 and 2 comprises only three plastic components, namely the connector body 2, the end piece 7 and the connector housing 6. In addition, there is the connector pin 1, made from material adapted to any individual case. Evidently, this connector can be assembled very simply.

FIG. 3 shows once again the principle construction of the connector according to FIGS. 1 and 2, in cross section. The connector housing is not shown here. Naturally the connector body 2 could also possess another shape, and, for example, be shaped rotationally symmetrical with the end piece 7. Connectors on which numerous pins are held in any desired arrangement are also conceivable.

Inasmuch as the invention is subject to modifications and variations, the foregoing description and accompanying drawings should not be regarded as limiting the invention, which is defined by the following claims and various combinations thereof:

What is claimed is a:

1. Connector for an optical fiber having at least one connector pin (1) and a connector body (2), the connector pin being held in the connector body by a spring element (4) biasing the pin axially, wherein the spring element and at least one portion of the connector body are integrally formed, and further comprising a pin socket (3) in which the connector pin is held firmly, wherein the spring is a skeleton type spring having an interrupted, hollow cylindrical receiving section, said section being formed integrally with said pin socket, and wherein the unit, comprising the pin socket, the spring element and the connector body, is manufactured from a plastic material.

2. Connector according to claim 1, characterized in that the connector pin (1) is manufactured from metal, metal-ceramic or ceramic and that it is glued into the receiving socket (3).

3. Connector according to claim 1, characterized in that the connector body is formed integrally with a hub (5) for accommodation of the optical fiber cable.

4. Connector according to claim 1, characterized in that an end piece (7), possessing a bore which surrounds the major portion of the connector pin (1), is able to be snapped onto the connector body (2).

5. Connector according to claim 1, characterized in that the connector body (1) is mounted to be axially displaceable within an outer connector housing.

6. Connector according to claim 5, characterized in that the connector body possesses at least one locking shoulder (9) for engagement of a locking catch (10) for the fastening of a sleeve portion (14), the locking shoulder protruding out of an opening in the connector housing (6) and the connector housing being provided with an incline (13) in the area of the locking shoulder which, with a tensile loading on the connector housing, lifts the locking catch (10) out of the locking shoulder (9).

7. Connector according to claim 1, characterized in that the connector pin (1) is formed integrally with the spring element (4) and is directly held by the latter onto the connector body (2).

* * * * *

UNITED STATES PATENT AND TRADEMARK OFFICE
CERTIFICATE OF CORRECTION

PATENT NO.  :  5,373,574

DATED       :  December 13, 1994

INVENTOR(S) :  Silvio Marazzi

It is certified that error appears in the above-identified patent and that said Letters Patent is hereby corrected as shown below: Title page:

Item [75]: Inventor, after "Silvio Marazzi, Cavigliano, Switzerland" insert --Silverio De Marchi, Contra, Switzerland--.

Signed and Sealed this

Twentieth Day of June, 1995

Attest:

BRUCE LEHMAN

*Attesting Officer*   *Commissioner of Patents and Trademarks*